US011325168B2

(12) United States Patent
Boiko (10) Patent No.: US 11,325,168 B2
(45) Date of Patent: May 10, 2022

(54) DISSOLVING SILICATE SCALE

(71) Applicant: Tri-Bros. Chemical Corp., Northbrook, IL (US)

(72) Inventor: Robert S. Boiko, Northbrook, IL (US)

(73) Assignee: TRI-BROS. CHEMICAL CORP., Northbrook, IL (US)

( * ) Notice: Subject to any disclaimer, the term of this patent is extended or adjusted under 35 U.S.C. 154(b) by 0 days.

(21) Appl. No.: 16/424,670

(22) Filed: May 29, 2019

(65) Prior Publication Data

US 2019/0366390 A1    Dec. 5, 2019

Related U.S. Application Data

(60) Provisional application No. 62/677,503, filed on May 29, 2018.

(51) Int. Cl.
*B08B 3/10* (2006.01)
*B08B 9/08* (2006.01)
*B08B 9/027* (2006.01)

(52) U.S. Cl.
CPC .............. *B08B 3/10* (2013.01); *B08B 9/027* (2013.01)

(58) Field of Classification Search
CPC ... B08B 3/10; B08B 9/027; B08B 9/08; C02F 1/4602; C02F 1/46104; C02F 2001/46138; C02F 2001/46161; C02F 2201/46135; C02F 2201/4617; F24H 9/0042
See application file for complete search history.

(56) References Cited

U.S. PATENT DOCUMENTS

| | | | |
|---|---|---|---|
| 3,242,688 A | 3/1966 | Miller | |
| 3,296,143 A | 1/1967 | Boiko | |
| 3,424,688 A * | 1/1969 | Boiko | C02F 5/083 |
| | | | 134/22.1 |
| 4,789,407 A | 12/1988 | Boiko | |
| 5,045,352 A * | 9/1991 | Mueller | E03C 1/30 |
| | | | 427/235 |
| 5,068,017 A * | 11/1991 | Boiko | C25F 1/06 |
| | | | 205/714 |
| 5,814,204 A * | 9/1998 | D'Muhala | C25F 1/00 |
| | | | 205/705 |

(Continued)

OTHER PUBLICATIONS

The Physics Classroom archived webpage dated Mar. 3, 2016 (from website https://web.archive.org/web/20160303193517/https://www.physicsclassroom.com/class/estatics/Lesson-4/Electric-Field-Intensity) (Year: 2016).*

*Primary Examiner* — Douglas Lee
(74) *Attorney, Agent, or Firm* — Nixon Peabody LLP (57) ABSTRACT

The present disclosure includes arrangements, systems, and methods for removing mineral deposits. Disclosed is an aqueous solution within a container, with the container containing mineral deposits. The aqueous solution submerges the mineral deposits and may include at least one acid, or a combination of an organic acid and an inorganic acid in percentages that allow the replacement of toxic dangerous chemical ingredients. Disclosed also is a cathode and an anode within the container that are at least partially submerged within the aqueous solution. A direct current power source is configured to direct a voltage across the cathode and the anode to generate an electrical charge gradient within the aqueous solution.

8 Claims, 4 Drawing Sheets

(56) References Cited

U.S. PATENT DOCUMENTS

| | | | | |
|---|---|---|---|---|
| 2011/0283728 A1* | 11/2011 | Furukawa | ............... | F24H 1/106 |
| | | | | 62/238.7 |
| 2013/0152982 A1* | 6/2013 | Tanaka | ...................... | B08B 3/10 |
| | | | | 134/115 R |
| 2013/0206671 A1* | 8/2013 | Ohira | ................... | B01D 61/422 |
| | | | | 210/321.6 |
| 2015/0258587 A1* | 9/2015 | Alleyne | .................... | B08B 9/00 |
| | | | | 134/22.18 |
| 2017/0120311 A1* | 5/2017 | Timmons | .................. | C02F 5/00 |

* cited by examiner

DISSOLVING SILICATE SCALE

CROSS-REFERENCE TO RELATED APPLICATION

This application claims priority under 35 U.S.C. § 119 to U.S. Provisional Application No. 62/677,503, entitled "DISSOLVING SILICATE AND OTHER TYPES SCALE," filed on May 29, 2018. The contents of this application are hereby incorporated by reference in their entirety.

FIELD OF INVENTION

The present application relates to the removal of mineral deposits in water systems through the application of energy and chemical action.

BACKGROUND

Water systems, and mixtures containing water, are among industrial and drinking (potable) water systems that may form mineral deposits consisting primarily of calcium carbonate. These mineral deposits are called by many names, such as limestone, scale, lime scale, calcified deposits, sediment, rock like build up, fouling, silicates, aluminates, and the like. The percentages of other elements and their salts to calcium carbonate in these deposits varies. Such variation depends on, for example, geographic location, variation of amount of water used, temperature, pressure, depth of well or method of municipal water treatment, other water treatment, construction, contents and appurtenances, settings of vessel, and the like.

Aqueous solutions and processes exist that attempt to remove the mineral deposits. However, the aqueous solutions and processes often rely on hazardous chemicals for their efficacy. Hazardous chemicals in general, and particularly for potable water systems, pose significant problems. Further, their performance does not necessarily justify their hazardousness.

Accordingly, a need exists for aqueous solutions and processes that can remove the mineral deposits without the hazardous chemicals while achieving or even exceeding the efficacy of conventional processes.

SUMMARY

Aspects of the present disclosure include an arrangement for removing mineral deposits. The arrangement includes an aqueous solution, a cathode, an anode, and a direct current power source. The aqueous solution is within a container that contains the mineral deposits. The aqueous solution fills the container to submerge the mineral deposits. The aqueous solution includes citric acid, phosphoric acid, or a combination thereof. The cathode is within the container and is at least partially submerged within the aqueous solution. The anode is within the container and is at least partially submerged within the aqueous solution. The direct current power source is configured to direct a voltage across the cathode and the anode to generate an electrical charge gradient within the aqueous solution.

Additional aspects of the present disclosure include a system for removing mineral deposits. The system includes a container containing the mineral deposits. The system further includes an aqueous solution within the container that submerges the mineral deposits. The aqueous solution includes at least one acid. The system further includes a cathode and an anode. The cathode and the anode are within the container and at least partially submerged within the aqueous solution. The system further includes a power source configured to direct a voltage across the cathode and the anode to generate an electrical charge gradient within the aqueous solution.

Further aspects of the present disclosure include a method for removing mineral deposits. The method includes providing an aqueous solution within a container containing the mineral deposits such that the aqueous solution submerges the mineral deposits. The aqueous solution could include at least one acid or a combination of acidic compounds. The method further includes providing at least one cathode and at least one anode within the container. The at least one cathode and the at least one anode are at least partially submerged within the aqueous solution. The method further includes applying a voltage across the at least one cathode and the at least one anode such that an electrical charge gradient forms within the aqueous solution.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims.

BRIEF DESCRIPTION OF THE DRAWINGS

The disclosure, and its advantages and drawings, will be better understood from the following description of exemplary embodiments together with reference to the accompanying drawings. These drawings depict only exemplary embodiments and are, therefore, not to be considered as limitations on the scope of the various embodiments or claims.

DETAILED DESCRIPTION

The various embodiments are described with reference to the attached figures, where like reference numerals are used throughout the figures to designate similar or equivalent elements. The figures are not drawn to scale, and they are provided merely for illustrative purposes. It should be understood that numerous specific details, relationships, and methods are set forth to provide a full understanding. One having ordinary skill in the relevant art, however, will readily recognize that the various embodiments can be practiced without one or more of the specific details, or with other methods. In other instances, well-known structures or operations are not shown in detail to avoid obscuring certain aspects of the various embodiments. The various embodiments are not limited by the illustrated ordering of acts or events, as some acts may occur in different orders and/or concurrently with other acts or events. Furthermore, not all illustrated acts or events are required to implement a methodology in accordance with the present invention.

Elements and limitations that are disclosed, for example, in the Abstract, Summary, and Detailed Description sections, but not explicitly set forth in the claims, should not be incorporated into the claims, singly, or collectively, by implication, inference, or otherwise. For purposes of the present detailed description, unless specifically disclaimed, the singular includes the plural and vice versa. The word "including" means "including without limitation." Moreover, words of approximation, such as "about," "almost," "substantially," "approximately," and the like, can be used herein to mean "at," "near," or "nearly at," or "within 3-5% of," or "within acceptable manufacturing tolerances," or any logical combination thereof, for example.

The present disclosure describes aqueous solutions, arrangements, and processes for removing mineral deposits within water systems. The aqueous solutions of the present disclosure do not contain hazardous chemicals found in conventional aqueous solutions for mineral deposit removal. Instead, application of the aqueous solutions of the present disclosure with electrical charge gradients increases the efficacy of the aqueous solution in removing the mineral deposits.

The negative charging of a vessel is known in the art, such as taught in U.S. Pat. No. 5,068,017. However, this negative charging is only effective in an unlined completely conductive environment where iron oxides are to be reduced in size to be flushed out of a heat exchanger or coil. In contrast, with respect to the present disclosure, it is important to not make any electrical contact with the vessel itself because charging the vessel will not properly form and direct the voltage gradient to be formed in the aqueous solution. The reactive activity occurs best in voltage gradients through the aqueous solution and not through the equipment. When the aqueous solution formulated as described in the present disclosure is combined with the electrical gradient and coulombs of electrical direct current flow through the mineral deposits, the mineral deposits break up. The result is a stronger reaction than other electrical flow paths formed when the aqueous solution is not the source of being energized. Thus, the activity is improved when the voltage/amperage gradients do not contact the objects contained therein. The formation of electrical gradients in the liquid is thus different from cathodic and anodic systems, or charging of vessels in general. In the present disclosure, it is not the vessel that is charged but it is instead the aqueous solution.

The gradient is formed through the aqueous solution by placing the aqueous solution within the container with the mineral deposits, in addition to placing one or more negative cathodes in the aqueous solution along with one or more positive anodes in the aqueous solution. Thus, in one or more embodiments, there is a single negative cathode and a single positive anode placed within the aqueous solution. However, in one or more embodiments, multiple negative cathodes, such as one or more rods or one or more plates, and multiple positive anodes, such as one or more rods or one or more plates, can be placed in the aqueous solution within the container. The multiple cathodes and/or anodes increases the current density in the voltage and amperage gradients through the aqueous solution, which increases activation of larger areas of the mineral deposits.

The anode and the cathode are preferably formed of a material that is inert within the chemical/oxidative environment of the aqueous solution. One such material for forming the cathode, the anode, or both is graphite. Graphite anodes and cathodes have suitable qualities to withstand the chemical/oxidative environment of the aqueous solution. Graphite also is a generally inert material that avoids an electrolytic forced reaction and combination with the active ingredients of the solution and direct combination with the oxygen produced in some of the cell interactions. However, in one or more embodiments, other cathodes and anodes can be formed of gold, platinum, or titanium steel that is formulated to be inert and not add any toxic components to the water or wastewater.

The sizes of the cathode and the anode can vary depending on various factors, such as the distance the cathodic and anodic charged electrodes must extend to reach the areas to which the scale is embedded. For better conductivity in higher amperage gradient formation, the graphite electrode can be a ¾" to 2" diameter electrode set. For example, the size of the cathode and the anode can reduce the turbulence of any hydrogen and oxygen gases generated during removal of the mineral deposits. In one or more embodiments, the cathode and the anode can be about a half inch in diameter for about 0.25-0.6 amperes of direct current flow, and about 3 inches or longer (as the liquid depth allows), to about one inch in diameter or larger if the openings of a container within which the cathode and the anode are inserted allow. In one or more embodiments, preferably the length can be designed to be greater than the depth of the level of aqueous solution in the container. Alternatively, if the length is no longer than the depth of the level of aqueous solution, care is taken so that the connection to the cathode and the anode that may be in the aqueous solution is not chemically reactive.

In one or more embodiments, the anode (e.g., hydrogen source) can be sized with as much surface area as practicable to reduce the amount of turbulence at various amperage flows. The higher amperages should be accompanied by more surface area of the positive electrode for anode construction selection. As an example of the formation of the expected hydrogen and oxygen and the necessity to assure the equipment has properly sized cathodes and anodes, if a graphite cathode and anode are ¼" in diameter, the surface area, not including the upper or bottom surfaces, can be about 4.7 square inches. A graphite cathode and anode that are ½" in diameter and 6" long would have a surface area of about 9.4 square inches. A graphite cathode and anode that are 2.5" diameter and 6" long is about 47 square inches, which means a significant reduction in current density, as the length or where possible the diameter is increased, which reduces the atomization.

In one or more embodiments, the anode, the cathode, or both can be covered in an electrically porous covering that is an insulating inert material, such as an electrical insulating plastic, fiber, ceramic, and the like. The electrically porous covering isolates the anode and the cathode from contacting each other or any surfaces of the equipment to which the mineral deposits are being removed. Because any contact between electrodes would cause an immediate fault, the coverings avoid that potential. Because many heat exchangers, some storage tanks and other equipment are not lined but are metallic, the coverings avoid any chance of the unit itself becoming electrically charged.

The aqueous solution can include at least one organic acid, or a combination of acidic compounds. In one or more embodiments, the aqueous solution can include acidic compounds, such as those described in U.S. Pat. Nos. 3,242,688, 3,296,143, 4,789,407, 5,068,017, the contents of which are hereby incorporated by reference in their entirety. The aqueous solution is formed with one or more organic acids. In one or more embodiments, the organic acids can be citric acid, an inorganic acid such as phosphoric acid in the 6% to 45% range by volume (vol %), while solid materials such as malic or ascorbic or citric and other organic acids would be by weight also in the 6 to 55 vol % range, with a preferred range of 7 to 25 vol % for many regularly properly maintained units, or a combination thereof. However, the use other organic acids that might be less active and/or have a significantly lower pH may still be subject to accelerated reaction when combined with the disclosed electrical arrangement. Such other organic acids can be, for example, lactic acid in the food grade versions, but it is weaker and may not perform as well as citric acid and phosphoric acid. In one or more embodiments, acetic acid can be used as the organic acid in the aqueous solution. However, a comparative test of quantities of mineral deposits dissolved by acetic acid in relation to the citric acid and/or phosphoric acid showed the fractional amount of scale dissolved. Yet, acetic acid may still be used for certain surfaces that only show a thin coating of mineral deposits, such as where water pools or evaporates (e.g., a shower door or tiles).

As discussed above, the concentration of the acid in the aqueous solution can vary depending on the severity of the mineral deposits being removed and the desired amperage through the aqueous solution. With respect to citric acid, the concentration in the aqueous solution can be about 7 to 55 vol %. Alternatively, the concentration of citric acid can be 7 to 35 vol %, and preferably 15 to 35 vol % for mineral deposits of silicate and highly non-porous rock-like scale. With respect to phosphoric acid, the concentration in the aqueous solution without citric acid can also vary depending on the severity of the mineral deposits being removed, such as being 7 to 45 vol % of phosphoric acid. Though, for severe mineral deposits, the 34 to 40 vol % range might be preferred with this method. For applications of mineral deposits that are harder to remove or that are more built-up, such as for industrial boilers, an aqueous solution of about 7 to 35 vol % of citric acid and about 3 to 8 vol % of phosphoric acid can be used.

Because the aqueous solutions are used in potentially potable water system, it is preferable that all ingredients within the aqueous solution in such environments are food grade and due to the even higher present purity standards, USA Sourced Food Grade, not Imported Food Grade, to avoid contamination with hazardous chemicals, or at least to avoid many additional rinsing steps to remove the potentially hazardous chemicals.

The aqueous solution can be used at room temperature or up to elevated temperatures. In one or more embodiments, the temperature of the aqueous solution can be about room temperature (e.g., about 23° C.) and up to about 120° C. However, in one or more embodiments, the temperature of the aqueous solution can be about room temperature of (e.g., about 23° C.) and up to about 46° C.

A power source provides varying potential across the cathode and the anode depending on the desired strength of the gradient and amount or severity of the mineral deposits being removed. The range of voltage that is acceptable is up to 120 volts (V) direct current. However, preferably the direct current that is used has a constant state above (negative flow to) 0, negative charge to the anode, though a waveform such as ½ wave or full wave rectified DC will also cause the increase in commercially acceptable speed to break down the silicate infused scale with its carbonate composition included. The voltage supply is preferably at about 8 to 36 V; however, about 12 to 36 V might have the best results for many conditions. In one or more embodiments, the potential or voltage across the cathode and the anode can be about 12 volts (V), or as high as about 24 V for large mineral deposits, or even as high as about 36 V for even larger mineral deposits. However, in one or more embodiments, the voltage can be up to about 60 V for particularly severe conditions of mineral deposit buildup.

The cathode can be arranged at a specified distance within the aqueous solution and from the mineral deposits. In one or more embodiments, the distance is a function of the voltage applied across the cathode and the anode. For example, at a voltage of about 12 V, the cathode can be within approximately 150 millimeters (mm) of the mineral deposits. At a voltage of about 24 V, the cathode can be within approximately 250 mm of the mineral deposits. At a voltage of about 36 V, the cathode can be within approximately 360 millimeters of the mineral deposits. In one or more embodiments, the anode can be located at a minimum of about 15% farther away from the mineral deposits than the farthest distance of the farthest negatively charged cathode from the mineral deposits. This is important to assure the gradient negative charge is high enough to activate the process where the chemical components are catalyzed to a higher state and an acceptable commercial speed developed to dissolve the type of scale that has formed.

The time required to remove and/or loosen the mineral deposits can be about two to four hours if the container is previously properly pre-flushed of loose sediment and prepared these ingredients singly or in the various combinations. However, longer times may be required to particularly severe mineral deposits.

Example 1

With a 12-volt direct current power source and the use of citric acid as the primary reactant against the mineral deposits within the aqueous solution, the direct current amperage flow could be about 0.25 amperes at about a 9 vol % of the citric acid with a conductive electrode spacing of about 180 millimeters between the negative electrode and the electrically permeable mesh covered positively charged electrode. There are two critical placements. The cathode supplying the negative current should be reasonably close to the scale deposit and the anode should be at least 15% further away to assure the entire deposit is covered in a negative charge. If the anode is too close, the gradient will miss a portion of the scale deposit and it will not properly dissolve.

Example 2

In a commercial sized tank-type potable water heater or a tank-type storage boiler system the deposits might be at the tank bottom. Depending on the specific size of the tank, about five to ten gallons of scale-removing solution would be required, and possibly refreshed if the material is neutralized by large amounts of scale build up. The depth of the aqueous solution could be about 100 to 150 mm. When the scale is accumulated in substantial amounts, such as several pounds that can be found in a commercial size heat exchange tank type or coil heat exchanger type unit, citric acid can be used in the amounts described above in combination with about 3-8 vol % of phosphoric acid. This may increase the amperage from a 12 V power supply to 1.8 to 2.3 amperes of direct current.

Example 3

For residential tankless water heaters, the same method can be used as is used for residential tank type water heaters with food grade citric acid. With the addition of an array of several anodes many millimeters (2-3 times) farther from the targeted silicate scale than the negatively charged cathode, the use of the citric acid only is likely effective, especially at about 26 volts, because of the resulting amperage of about 0.4 to 0.7 amps.

Figure 1:
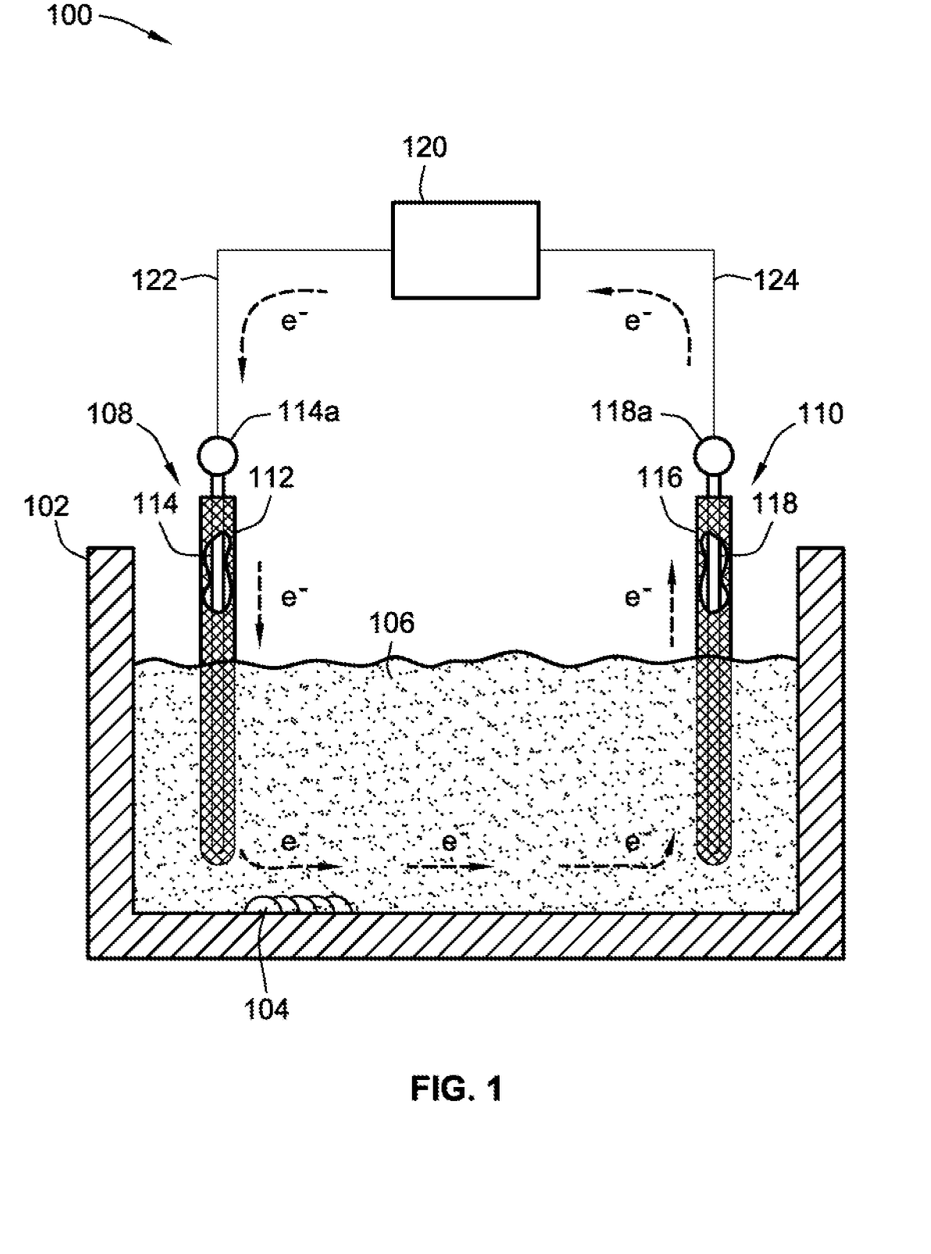
FIG. 1 illustrates a cross-section of a general container within an arrangement configured to remove mineral deposits from within the container, according to an embodiment of the present disclosure.

Referring to FIG. 1, illustrated is a cross-section of a general container 102 within an arrangement 100 configured to remove mineral deposits 104 from within the container 102. The container 102 can be any type of container that may contain mineral deposits. In the illustrated embodiment, the container 102 may be open for access to the mineral deposits 104. Alternatively, the container 102 may have a lid or top (not illustrated) that can be removed for access to the mineral deposits 104.

The mineral deposits 104 may have any chemical makeup of mineral deposits found in water systems. For example, the mineral deposits 104 can be calcium carbonate, silicate containing lime scale, any mineral deposit described above, or combinations thereof. The mineral deposits 104 can be formed over time according to any process, such as water containing minerals evaporating over time and depositing the minerals.

The arrangement 100 includes a quantity of aqueous solution 106 within the container 102 as described above. The aqueous solution 106 can be any aqueous solution of the present disclosure described above.

The arrangement 100 further includes a cathode 108 and an anode 110 within the container 102 and at least partially submerged within the aqueous solution 106. The cathode 108 includes an electrically porous covering 112 surrounding a conductor 114. Similarly, the anode 110 includes an electrically porous covering 116 surrounding a conductor 118.

The electrically porous coverings 112 and 116 are not conductive but porous to electrical charge and prevent the conductors 114 and 118 from making contact with anything in the container 102 besides the aqueous solution 106. Thus, the electrically porous coverings 112 and 116 ensure that an electrical gradient is formed within the aqueous solution 106 rather than in any other part of the arrangement 100. In other words, the electrically porous coverings 112 and 116 prevent contact between any current carrying conductor (e.g., conductors 114 and 118) and the container 102. Thus, while prior conventional process may have charged the container 102 itself, the presence of the electrically porous coverings 112 and 116 prevent the container 102 from being electrically charged.

The electrically porous coverings 112 and 116 can be formed of the same material or different materials. For example, the electrically porous coverings 112 and 116 can be formed of any recognized thermoplastic wire insulation with the inclusion of small holes or other porous method to assure conductivity to the liquid does occur. While many recognized plastic-type insulators that are resistant to the relatively mild chemical components exist, and will withstand the relatively low temperatures of the reactants, if not titanium, platinum, gold, or another inert material, but ½" graphite rods used as the electrodes, they may also be encased in drilled out CPVC pipe.

The conductor 114 is a negatively charged conductor. The conductor 118 is a positively charged conductor. As discussed above, the conductors 114 and 118 are preferably formed of a material that is inert within the electrically charged aqueous environment to avoid or inhibit depositing ionic material from the conductors 114 and 118 on exposed surfaces, such as on exposed metal surfaces of the container 102. In one or more embodiments, the electrodes that contact the liquid are preferably formed of graphite. However, in one or more alternative embodiments, the conductors 114 and 118 can be formed of gold, platinum, titanium certain noble ferrous alloys, and the like. In one or more embodiments, for the negatively charged electrode, other material can be used that is less inert, such as copper, silver, higher inert ferrous alloys, and the like. However, these materials may cause unwanted deposits in the equipment due to the formation of metallic ions. The actual wiring which has no contact with the process liquids, can be properly sized per the NEC tables should be copper wiring. In one or more embodiments, aluminum is not preferred for wiring because it is such an active metal, degrades easily in moisture, and chemicals attack aluminum, especially the type of materials described in this embodiment. Aluminum also has a much higher coefficient of expansion than copper.

Ends 114a and 118a of the cathode 108 and anode 110, respectively, that are outside of the aqueous solution 106 are connected to a power source 120, such as a direct current power source, via electrical connections 122 and 124, respectively.

As illustrated by the arrows, electrons e⁻ flow from the direct current power source 120 to the cathode 108 via the connection 122. From the cathode 108, the electrons e⁻ flow into the aqueous solution 106 because the cathode 108 as a whole, i.e., the covering 112 and the conductor 114, does not touch the container 102, the mineral deposits 104, or any other piece of equipment (e.g., anode 110) within the container 102. By flowing into the aqueous solution 106, the electrons e⁻ also flow into the mineral deposits 104. Flow of the electrons e⁻ into the mineral deposits 104 in part breaks up the mineral deposits 104. The electrons e⁻ further flow into the anode 110 and subsequently back to the power source 120 via the connection 124.

Although only one cathode 108 and one anode 110 are illustrated and described above, one or more embodiments can have more than one cathode 108, more than one anode 110, or both. Thus, there can be an array of cathodes 108 and/or an array of anodes 110. The arrays allow for greater coverage of the gradients within the aqueous solution within the container 102, such as when the mineral deposits cover a greater area of the container 102.

Figure 2:
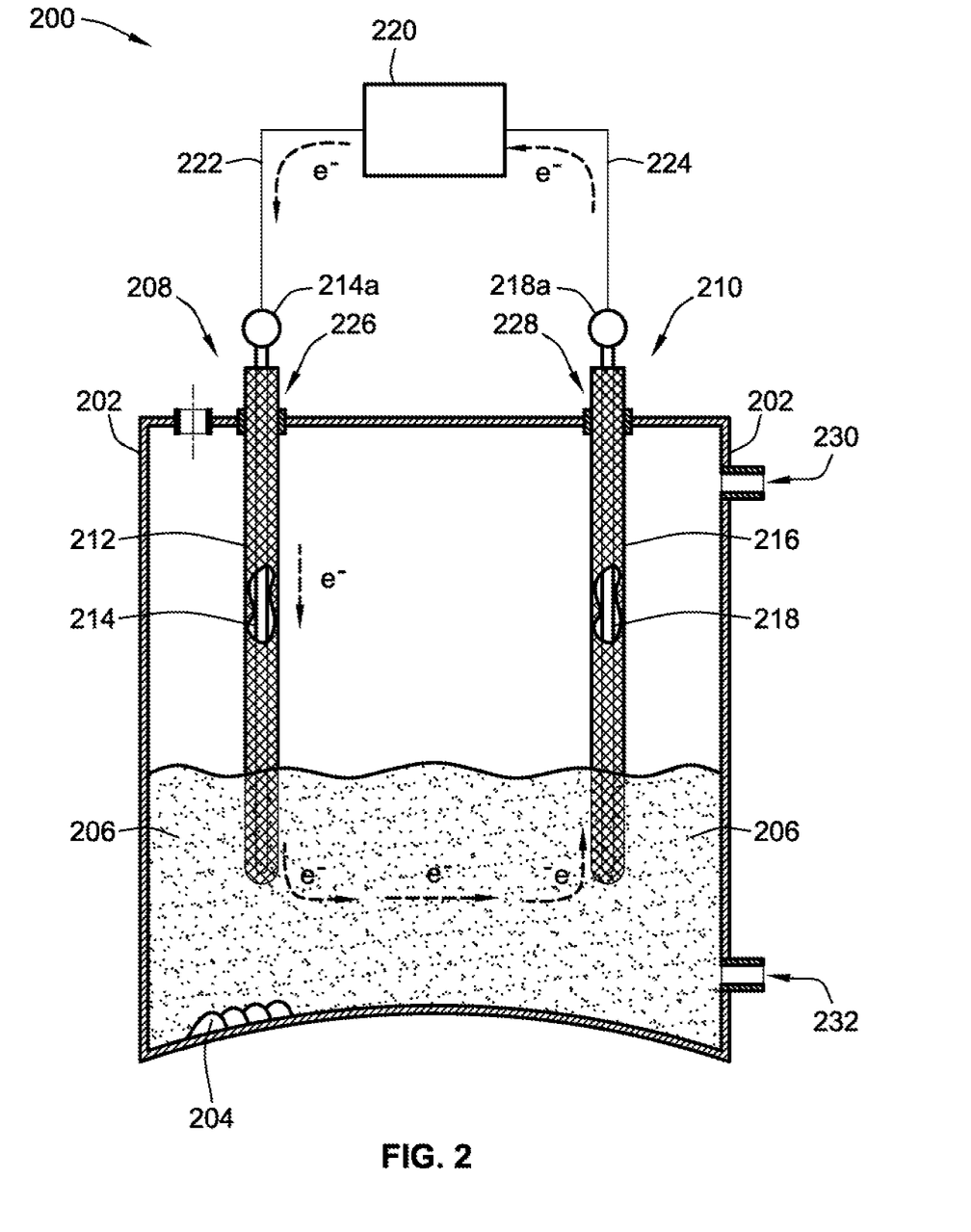
FIG. 2 illustrates a cross-section of a tank-type vessel within an arrangement configured to remove mineral deposits from within the container, according to an embodiment of the present disclosure.

FIG. 2 illustrates a cross-section of a tank-type vessel 202 within an arrangement 200 configured to remove mineral deposits 204 from within the vessel 202. The vessel 202 of FIG. 2 can specifically be a hot water heater, such as a residential hot water heater in which the mineral deposits 204 develop over time from the repeated heating of mineral-containing water. The vessel 202 includes ports 226 and 228 that may correspond to, for example, the hot water outlet and the cold water inlet, respectively. The vessel 202 may also have a temperature and/or pressure relief outlet or valve 230 and a drain outlet and/or valve 232. For the vessel 202, the temperature and/or pressure relief outlet or valve 230 can be used to vent the vessel of any excess hydrogen and/or oxygen gas that is created. Indeed, proper venting of the excess hydrogen and/or oxygen gas that is created within any closed container is helpful to prevent a potential explosion and/or fire are a result of accumulated gas.

The mineral deposits 204 are similar to the mineral deposits 104 in FIG. 1 and, therefore, can be any mineral deposits described herein.

Similar to the arrangement 100 and the container 102, the arrangement 200 and the vessel 202 includes a quantity of aqueous solution 206. The aqueous solution 206 can be any aqueous solution of the present disclosure described above.

The arrangement 200 further includes a cathode 208 and an anode 210 within the vessel 202 and at least partially submerged within the aqueous solution 206. The cathode 208 is the negatively charged electrode and the anode 210 is the positively charged electrode. The cathode 208 and anode 210 are similar to the cathode 108 and anode 110 described above and include electrically porous coverings 212 and 216 surrounding conductors 214 and 218, respectively. The electrically porous coverings 212 and 216 surrounding conductors 214 and 218 are similar to the coverings 112 and 116 and conductors 114 and 118 described above with respect to FIG. 1. Thus, description of the coverings 112 and 116 and conductors 114 and 118 above applies to the coverings 212 and 216 and conductors 214 and 218.

The cathode 208 can be inserted into, for example, the port 226 and the anode 210 can be inserted into, for example, the port 228 for access into the vessel 202 and contact with the aqueous solution 206. Alternatively, insertion into the ports 226 and 228 can be reversed. Even further, in one or more embodiments, one or more of the cathode 208 and the anode 210 can instead be inserted into the vessel 202 through the temperature and/or pressure relief outlet or valve 230 and/or the drain outlet and/or valve 232.

Ends 214a and 218a of the cathode 208 and anode 210, respectively, are corrected to a power source 220, such as a direct current power source, via electrical connections 222 and 224, respectively.

As illustrated by the arrows, electrons e⁻ flow from the power source 220 to the cathode 208 via the connection 222. From the cathode 208, the electrons e⁻ flow into the aqueous solution 206 because the cathode 208 as a whole, i.e., the covering 212 and the conductor 214, do not touch the vessel 202, the mineral deposits 204, or any other piece of equipment (e.g., anode 210) within the vessel 202. By flowing into the aqueous solution 206, the electrons e⁻ also flow into the mineral deposits 204. Flow of the electrons e⁻ into the mineral deposits 204 in part breaks up the mineral deposits 204. The electrons e⁻ further flow into the anode 210 and subsequently back to the power source 220 via the connection 224.

Figure 3:
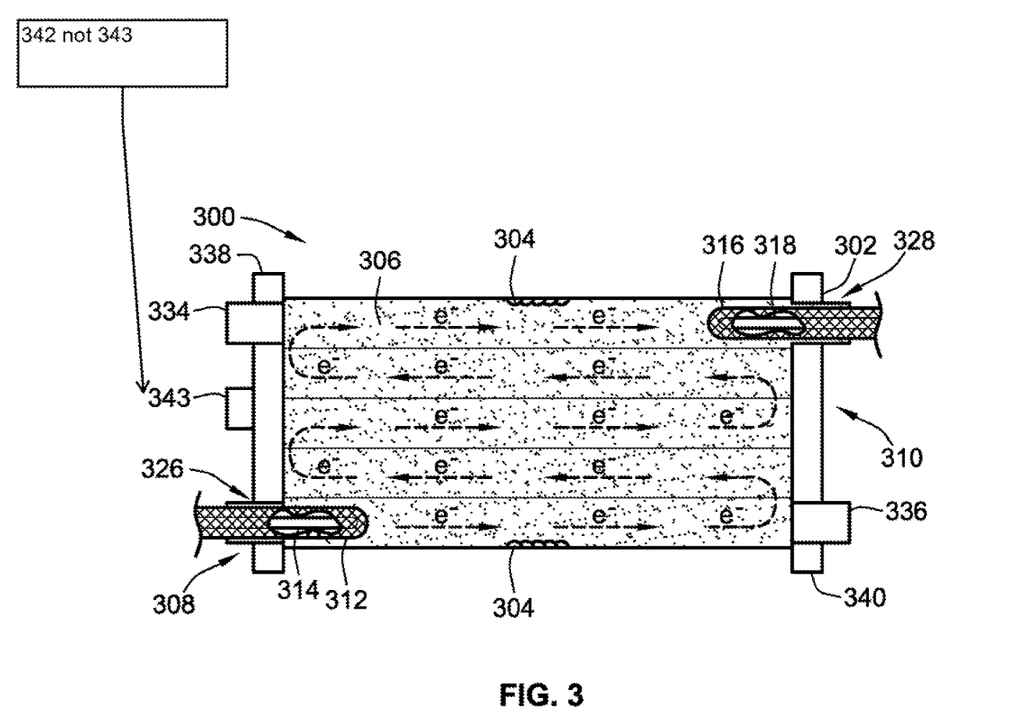
FIG. 3 illustrates a heat exchanger within an arrangement configured to remove mineral deposits from within the exchanger, according to an embodiment of the present disclosure.

FIG. 3 illustrates a heat exchanger 302 within an arrangement 300 configured to remove mineral deposits 304 from within the exchanger 302. The mineral deposits 304 may build up in the heat exchanger based on the repeated flow of hot mineral-containing water through the exchanger 302. The exchanger 302 includes an inlet port 326 and an outlet port 328 where hot water may enter and cooled water may exit, respectively. Accordingly, the mineral deposits 304 may develop within the exchanger 302 between the inlet port 326 and the outlet port 328. The exchanger 302 may also have an inlet port 334 and outlet port 336 for the fluid that is heated by the hot water. The ports 326, 328, 334, and 336 extend from header plates 338 and 340. The exchanger 302 may also have a relief valve 342 to prevent the buildup of excess pressure.

The mineral deposits 304 are similar to the mineral deposits 104 and 204 in FIGS. 1 and 2, respectively, and, therefore, can be any mineral deposits described herein.

Similar to the arrangements 100 and 200 and the container 102 and vessel 202, the arrangement 300 and the exchanger 302 includes a quantity of aqueous solution 306. The aqueous solution 306 can be any aqueous solution of the present disclosure described above.

The arrangement 300 further includes a cathode 308 and an anode 310 within the exchanger 302. The cathode 308 is the negatively charged electrode and the anode 310 is the positively charged electrode. The cathode 308 and anode 310 are similar to the cathode 108 and anode 110 described above and include electrically porous coverings 312 and 316 surrounding conductors 314 and 318, respectively. The electrically porous coverings 312 and 316 surrounding conductors 314 and 318 are similar to the coverings 112, 116, 212, and 216 and the conductors 114, 118, 214, and 218 described above with respect to FIGS. 1 and 2. Thus, description of the coverings 112, 116, 212, and 216 and the conductors 114, 118, 214, and 218 above applies to the coverings 312 and 316 and conductors 314 and 318.

The aqueous solution 306 must be contained within the exchanger 302 during removal of the mineral deposits 304. Accordingly, the cathode 308 and the anode 310 can be sealed within the ports 326 and 328, respectively, to prevent the aqueous solution 306 from draining out of the exchanger 302. Further, in one or more embodiments, the aqueous solution 306 can be continuously pumped through the exchanger 302. The continuous flow of the aqueous solution 306 provides a constantly refreshed solution for removing the mineral deposits.

Although not described above, similar pumping of the aqueous solutions 106 and 206 can occur to provide a constant supply of fresh aqueous solution. For example, an inlet and an outlet for a supply of the aqueous solution 106 can be inserted into the container 102 of FIG. 1. Similarly, an inlet and an outlet for a supply of the aqueous solution 206 can be inserted into the temperature and/or pressure relief outlet or valve 230 and/or the drain outlet and/or valve 232 of the vessel 202 of FIG. 2.

Referring back to FIG. 3, as illustrated by the arrows, electrons e⁻ flow from a power source (not shown) to the cathode 308. From the cathode 308, the electrons e⁻ flow into the aqueous solution 306 because the cathode 308 as a whole, i.e., the mesh 312 and the conductor 314, do not touch the exchanger 302, the mineral deposits 304, or any other piece of equipment (e.g., anode 310) within the exchanger 302. By flowing into the aqueous solution 306, the electrons e⁻ also flow into the mineral deposits 304. Flow of the electrons e⁻ into the mineral deposits 304 in part breaks up the mineral deposits 304. The electrons e⁻ further flow into the anode 310 and subsequently back to the power source 320 via the connection 324.

Figure 4:
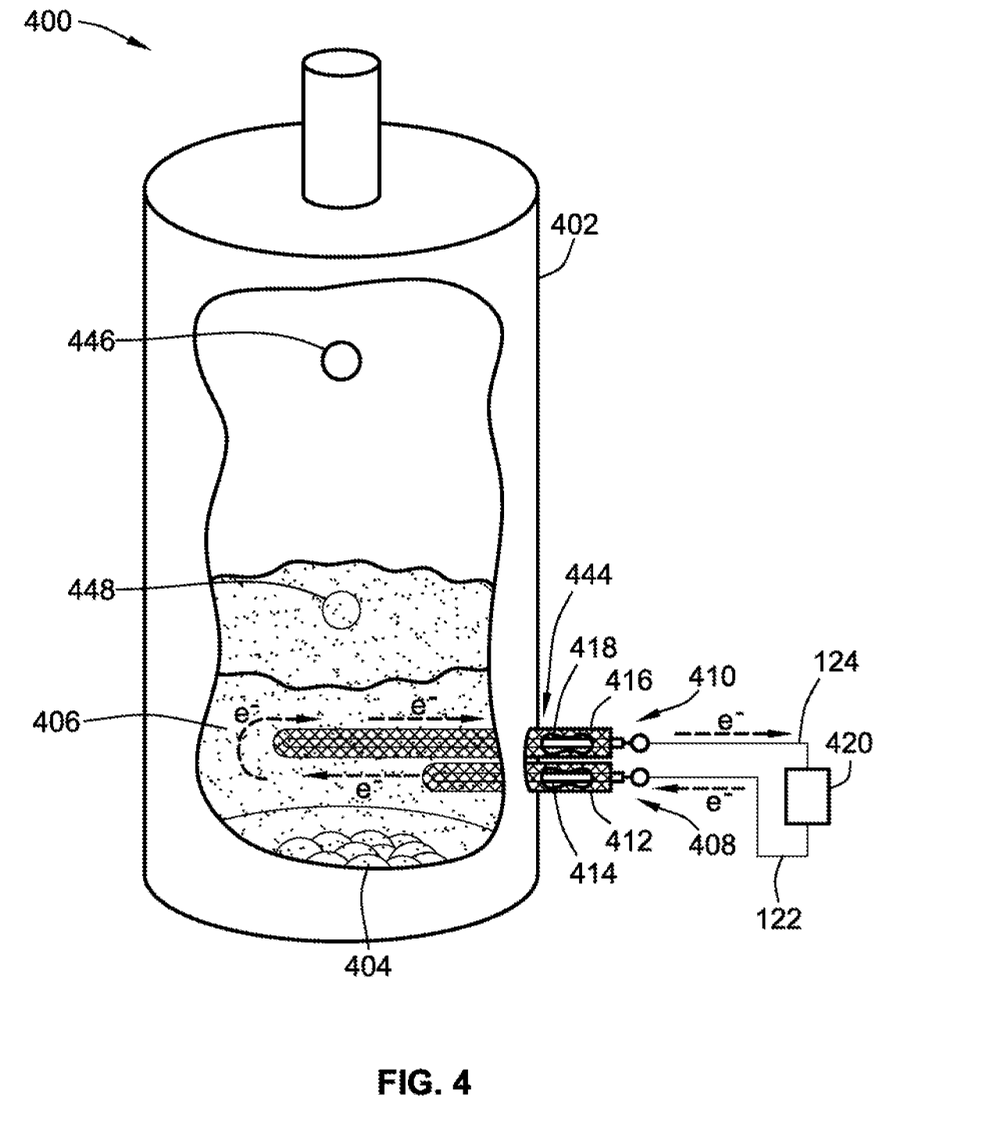
FIG. 4 illustrates an industrial water heater with a cleanout opening within an arrangement configured to remove mineral deposits from within the heater, according to an embodiment of the present disclosure.

FIG. 4 illustrates an industrial water heater 402 with a clean-out opening 444 within an arrangement 400 configured to remove mineral deposits 404 from within the heater 402. The heater 402 includes the clean-out opening 444, which distinguishes the heater 402, at least in part, from the vessel 202 of FIG. 2. The heater 402 also includes a water inlet port 446 and a water outlet port 448.

The mineral deposits 404 can be similar to the mineral deposits 104 in FIG. 1 and, therefore, can be any mineral deposits described herein. However, the amount of the mineral deposits may be more than the vessel 202 of FIG. 2 because of, for example, a larger volume of the heater 402 compared to the vessel 202, a greater amount of heating the heater 402 produces in comparison to the vessel 202, or other factors. Accordingly, more sever conditions may be used to remove the mineral deposits 404 from the heater 402 as compared to the mineral deposits 204 of the vessel 202.

Similar to the arrangement 100, the heater 402 within the arrangement 400 includes a quantity of aqueous solution 406. The aqueous solution 406 can be any aqueous solution of the present disclosure described above. However, as described in the preceding paragraph, the aqueous solution used may be, for example, an aqueous solution containing both citric acid and phosphoric acid to the break up the larger amounts of mineral deposits 404.

The arrangement 400 further includes a cathode 408 and an anode 410 within the heater 402 and at least partially submerged within the aqueous solution 406. The cathode 408 is the negatively charged electrode and the anode 410 is the positively charged electrode. The cathode 408 and the anode 410 are similar to the cathode 108 and anode 110 described above and include electrically porous coverings 412 and 416 surrounding conductors 414 and 418, respectively. The electrically porous coverings 412 and 416 surrounding the conductors 414 and 418 are similar to the coverings 112 and 116 and conductors 114 and 118 described above with respect to FIG. 1. Thus, descriptions of the coverings 112 and 116 and the conductors 114 and 118 above applies to the coverings 212 and 216 and conductors the 214 and 218.

The cathode 408 and the anode 410 can be inserted into, for example, the clean-out opening 444 for access into the heater 402 and contact with the aqueous solution 406. Alternatively, one or both of the cathode 408 and the anode 410 can be inserted into the heater 402 through one or both of a water inlet port 446 and a water outlet port 448.

Ends 414a and 418a of the cathode 408 and anode 410, respectively, are corrected to a power source 420 (e.g., a direct current power source) via electrical connections 422 and 424, respectively.

As illustrated by the arrows, electrons e⁻ flow from the direct current power source 420 to the cathode 408 via the connection 422. From the cathode 408, the electrons e⁻ flow into the aqueous solution 406 because the cathode 408 as a whole, i.e., the covering 412 and the conductor 414, do not touch the heater 402, the mineral deposits 404, or any other piece of equipment (e.g., anode 410) within the heater 402. By flowing into the aqueous solution 406, the electrons e⁻ also flow into the mineral deposits 404. Flow of the electrons e⁻ into the mineral deposits 404 in part breaks up the mineral deposits 404. The electrons e⁻ further flow into the anode 410 and subsequently back to the power source 420 via the connection 424.

The aqueous solutions, arrangements, and methods disclosed herein provide for better removal of mineral deposits within water systems without requiring reactive, toxic, deadly hydrofluoric-type materials, hydrochloric muriatic acids or other dangerous acids that are toxic or otherwise much less desirable in or on the human body.

While various embodiments of the present invention have been described above, it should be understood that they have been presented by way of example only, and not limitation. Numerous changes to the disclosed embodiments can be made in accordance with the disclosure herein without departing from the spirit or scope. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations, and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The terminology used herein is for the purpose of describing particular embodiments only and is not intended to be limiting. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this invention belongs. Furthermore, terms, such as those defined in commonly used dictionaries, should be interpreted as having a meaning that is consistent with their meaning in the context of the relevant art and will not be interpreted in an idealized or overly formal sense unless expressly so defined herein.

What is claimed is:

1. A method for removing silicate scale built up within a container holding potable water, the method comprising:
    providing an aqueous solution within the container containing the silicate scale such that the aqueous solution submerges the silicate scale, the aqueous solution including citric acid, phosphoric acid, or a combination of citric acid and phosphoric acid;
    providing at least one cathode within the container and at least partially submerged within the aqueous solution, each cathode of the at least one cathode having a first conductor surrounded by a first electrically porous covering, the first electrically porous covering electrically isolating the first conductor from the container such that the at least one cathode is not electrically connected to the container;
    providing at least one anode within the container and at least partially submerged within the aqueous solution, each anode of the at least one anode having a second conductor surrounded by a second electrically porous covering, the second electrically porous covering electrically isolating the second conductor from the container such that the at least one anode is not electrically connected to the container; and
    applying a voltage across the at least one cathode and the at least one anode such that an electrical charge gradient forms within the aqueous solution, the voltage being one of:
        (i) 12 volts, with the at least one cathode about 150 millimeters from the silicate scale;
        (ii) 24 volts, with the at least one cathode about 250 millimeters from the silicate scale; or
        (iii) 36 volts, with the at least one cathode about 360 millimeters from the silicate scale,
    wherein the first electrically porous covering and the second electrically porous covering electrically isolating the first conductor and the second conductor from the container promotes formation of the electrical charge gradient within the aqueous solution.

2. The method of claim 1, further comprising providing a direct current power source for applying the voltage across the at least one cathode and the at least one anode.

3. The system of claim 1, wherein a concentration of the citric acid is 7 to 35 percent by volume of the aqueous solution.

4. The system of claim 1, wherein a concentration of the phosphoric acid is 7 to 45 percent by volume of the aqueous solution.

5. The method of claim 1, wherein a concentration of the citric acid is 7 to 35 percent by volume of the aqueous solution and a concentration of the phosphoric acid is 3 to 8 percent by volume of the aqueous solution.

6. The method of claim 1, wherein the at least one anode is at least 15% farther away from the silicate scale than a closest cathode of the at least one cathode.

7. The method of claim 1, wherein the citric acid, the phosphoric acid, or the combination of citric acid and phosphoric acid are food grade.

8. The method of claim 1, wherein the aqueous solution does not contain hydrofluoric acid.

\* \* \* \* \*